July 25, 1950  A. CANTON  2,516,448
TRIMMING TOOL
Filed July 6, 1948
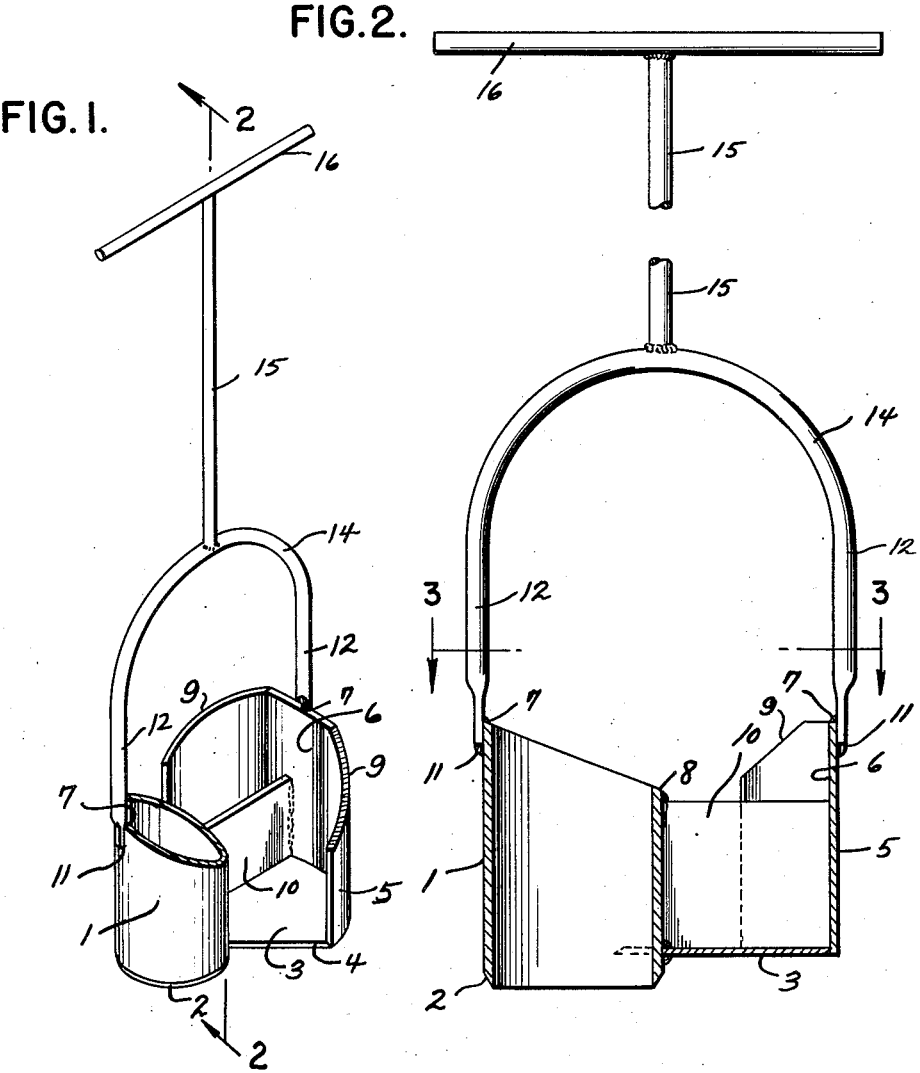
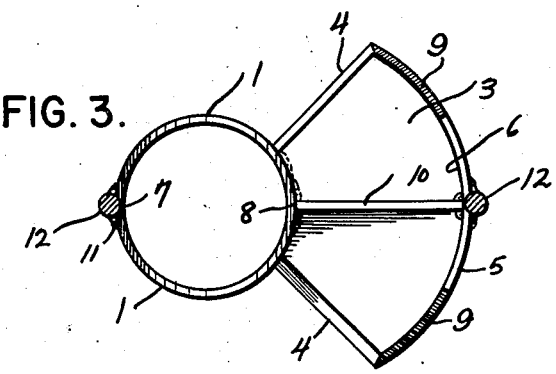
INVENTOR.
Arthur Canton
BY
Attorney Patented July 25, 1950

2,516,448

UNITED STATES PATENT OFFICE 2,516,448

TRIMMING TOOL

Arthur Canton, South Pasadena, Calif.

Application July 6, 1948, Serial No. 37,149

4 Claims. (Cl. 30—316)

This invention relates to a trimming tool and has relation more particularly to a tool of this kind for maintaining a neat cleared area in a lawn around the spray heads of a sprinkler system or the like.

It is an object of the invention to provide a tool of this kind having means for coaction with a sprinkler head or the like to assure desired travel therearound of the cutting element of the tool.

Another object of the invention is to provide a tool of this kind including a cutting element operating with equal advantage upon recurrent movement of the cutting element.

The invention consists in the details of construction and in the combination of the several parts of my improved trimming tool whereby certain advantages are attained, as will be hereinafter more fully set forth.

In order that my invention may be better understood I will now proceed to describe the same with reference to the accompanying drawings, wherein:

Figure 1 is a view in perspective of a trimming tool constructed in accordance with an embodiment of the invention;

Figure 2 is an enlarged sectional view taken substantially on the line 2—2 of Figure 1; and Figure 3 is a sectional view taken substantially on the line 3—3 of Figure 2.

As illustrated in the accompanying drawings, 1 denotes a tubular body or guide member, preferably cylindrical, and which is open at both ends. The interior diameter of the body or member 1 is such to permit the same to readily surround a head of a lawn sprinkler system or kindred element on the surface of a lawn. The lower marginal of the body or member 1 is inwardly beveled entirely therearound to provide a knife edge 2 to facilitate the desired penetration of the body or member 1 into the sod.

At a predetermined distance above the lower end thereof, the body or member 1 has welded or otherwise rigidly secured thereto a flat arcuate blade 3, said blade being in a plane substantially perpendicular to the axial center of the body or guide member 1. The blade 3 is herein shown as extending less than one half around the body or member 1 but the structure is not necessarily limited in this respect.

This blade 3 limits the extent of penetration of the body or member 1 into the sod and the opposite ends of the blade are downwardly beveled to provide the knife or cutting edges 4. The blade 3 is also of a width determined by the extent of area desired to be trimmed. The knife or cutting edges 4 are radial with respect to the axial center of the body or member 1.

The outer margin of the blade 3 is defined by an upstanding wall 5 having the top edge of its central portion 6 substantially flush with the high point 7 of the top of the body or member 1 which is disposed on an inward and downward incline of approximately 30° with the low point 8 opposed to the longitudinal center of the wall 5. The opposite end portions 9 of the upper edge of the wall 5 are outwardly and downwardly inclined on an angle of approximately 45° and which inclined portions 9 provide means for lifting high grass or other growth or matter that might otherwise interfere with the effective use of the tool.

Interposed between and rigid with the longitudinal central portion of the wall 5 and the body or member 1 immediately below the low point 8 at the top is a straight dividing wall 10 which extends from the top surface of the blade 3 to a point closely adjacent to the low point 8 at the top of the body or member. This plate 10 not only serves as a stiffener or brace for the plate 5 but provides at opposite sides thereof receiving chambers for the material cut by the blade 3 upon turning movement of the body or member in either direction. The wall 10 also prevents the material received upon one end portion of the blade 3 during a cutting operation being discharged at the opposite end of the blade 3, thereby facilitating removal of the cut material aside from preventing the cut material interfering with continued use of the tool.

Securely fastened as at 11, by welding or otherwise, to the outer high portion 7 at the top of the body or member 1, and the longitudinal central portion of the wall 5 at the top thereof, are the extremities of a rigid bail 12, herein disclosed in the form of an inverted U. Rigid with the central portion of the intermediate or cross member 14 of the bail 12 is an end portion of an elongated rigid handle 15 provided at its outer end portion with a cross bar 16 to be grasped by the operator in the required handling of the tool.

From the foregoing description it is thought to be obvious that a trimming tool constructed in accordance with my invention is particularly well adapted for use by reason of the convenience and facility with which it may be assembled and operated.

I claim:

1. A trimming tool of the character stated comprising a vertical cylindrical body open at its bottom end, said end having a sharpened earth penetrating edge, an arcuate wall substantially concentric with and spaced from said body and only partially encircling the body, a flat sector blade extending horizontally laterally from the body between the same and the bottom edge of said wall, the sector blade having a sharpened radial edge, and a handle having two joined legs straddling the tool and connected with the body and wall.

2. A trimming tool of the character stated in claim 1, in which the said sector blade is disposed in a plane above the sharpened bottom edge of the cylindrical body, said plane being perpendicular to the axis of the body.

3. A trimming tool of the character stated comprising a vertical cylindrical body open at its bottom end, said end having a sharpened earth penetrating edge, an arcuate wall substantially concentric with and spaced from said body, a flat sector blade extending horizontally laterally from the body between the same and the bottom edge of said wall, the sector blade having a sharpened radial edge, and a handle having two joined legs straddling the tool and connected with the body and wall, both of the radial edges of the sector blade being sharpened, and a vertical wall disposed substantially midway between the sharpened radial edges of the sector blade and extending radially outwardly from and connecting the cylindrical body with the arcuate wall.

4. A trimming tool of the character stated comprising a vertical cylindrical body open at its bottom end, said end having a sharpened earth penetrating edge, an arcuate wall substantially concentric with and spaced from said body and only partially encircling the body, a flat sector blade extending horizontally laterally from the body between the same and the bottom edge of said wall, said sector blade having its outer edge of the same circumferential dimension as the wall, the sector blade having sharpened radial edges, and a handle having two spaced legs at its lower end straddling the tool, one of said legs being secured to the arcuate wall and the other leg being secured to the cylindrical body at the side of the latter remote from the arcuate wall.

ARTHUR CANTON.

REFERENCES CITED

The following references are of record in the file of this patent:

UNITED STATES PATENTS

| Number | Name | Date |
| --- | --- | --- |
| 330,246 | Leonhardt | Nov. 10, 1885 |
| 1,480,151 | Cosman | Jan. 8, 1924 |
| 1,791,957 | Cummings | Feb. 10, 1931 |
| 1,866,073 | Aberle | July 5, 1932 |